No. 886,416. PATENTED MAY 5, 1908.
P. RUDOLPH.
PHOTOGRAPHIC OBJECTIVE.
APPLICATION FILED JULY 12, 1907.

UNITED STATES PATENT OFFICE.

PAUL RUDOLPH, OF JENA, GERMANY, ASSIGNOR TO THE FIRM OF CARL ZEISS, OF JENA, GERMANY.

PHOTOGRAPHIC OBJECTIVE.

No. 886,416.     Specification of Letters Patent.     Patented May 5, 1908.

Application filed July 12, 1907. Serial No. 383,412.

*To all whom it may concern:*

Be it known that I, PAUL RUDOLPH, doctor of philosophy, a citizen of the German Empire, and residing at Carl Zeiss strasse, Jena, in the Grand Duchy of Saxe-Weimar, Germany, have invented a new and useful Photographic Objective, of which the following is a specification.

The invention relates to triple-lens photographic objectives with a diaphragm in front, in which a collective cemented front surface presents the convexity and a dispersive cemented back surface the concavity towards the diaphragm. Such objectives are already shown in the patent specification 528155, Figure 2, and they are shown and described in the British patent specification 4692/93, Fig. 1. While, however, in the objective described in 4692/93 with reference to Fig. 1 the kinds of glass are chosen, so that the difference in index of refraction at the dispersive cemented surface is about the same amount as at the collective cemented surface, according to the present invention a more perfect correction of the spherical or the astigmatic aberration can be obtained by augmenting the difference between the refractive indices at the collective cemented surface—at the cost of the difference at the dispersive cemented surface—so that the difference at the collective cemented surface will be at least twice as great as that at the dispersive one. The result of this improvement may be directed to manifest itself either in a spherical correction for a relatively large aperture, or in diminished zones of spherical aberration, or in diminished astigmatic differences combined with satisfactory flatness of the image. This result extends not only to single objectives, in which the sine condition is fulfilled simultaneously with spherical correction, but also to systems, in which little or no regard has been paid to the sine condition. In the first case good components for convertible objectives can be obtained, in the second, components, of which two must be combined into a double objective in order to show a quite satisfactory correction.

Figure 1:
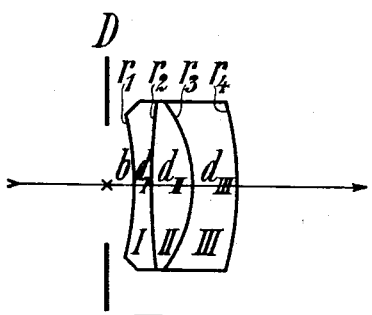
Figure 2:
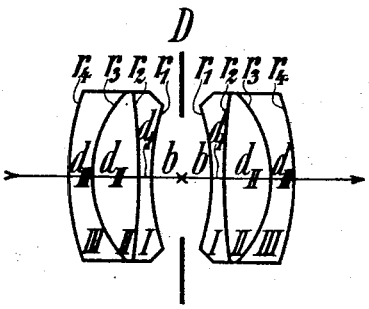

In the annexed drawing: Fig. 1 represents a single objective constructed according to the invention and corrected so as to fulfil also the sine condition. Fig. 2 represents a double objective constructed according to the invention, neither component objective being corrected as to the sine condition.

In the following tables referring to Figs. 1 and 2 the numbers give the radii, thicknesses and distances for a focal length 100. The kinds of glass made use of are rendered recognizable through the refractive index $n_D$ (for the D-line of the solar spectrum) and $n_G'$ (for the H$y$-line of the hydrogen spectrum).

Example 1 (Fig. 1). Achromatic objective of three cemented lenses with diaphragm D placed in front and of the relative aperture 1 : 11.0. A collective lens II is inclosed between two dispersive lenses I and III.

*Radii, Thicknesses and Distances.*

$r_1 = 15.0$        $b = 1.4$
$r_2 = 36.4$        $d_I = 0.8$
$r_3 = 6.9$          $d_{II} = 2.0$
$r_4 = 15.6$        $d_{III} = 2.2$

*Kinds of Glass.*

I : $n_D = 1.4967$     $n_G' = 1.5063$
II : $n_D = 1.6128$     $n_G' = 1.6286$
III : $n_D = 1.6570$     $n_G' = 1.6810$

Example 2 (Fig. 2). Spherically, astigmatically and chromatically corrected double objective of two equal triple lenses, in either of which a collective lens II is inclosed between two dispersive lenses I and III. The two components are symmetrically arranged in front of and behind the diaphragm D. The relative aperture of the double objective is 1 : 6.3.

*Radii, Thicknesses and Distances.*

$r_1 = 20.3$        $b = 2.7$
$r_2 = 54.8$        $d_I = 1.0$
$r_3 = 10.7$        $d_{II} = 4.1$
$r_4 = 22.6$        $d_{III} = 2.1$

*Kinds of Glass.*

I : $n_D = 1.4626$     $n_G' = 1.4714$
II : $n_D = 1.5832$     $n_G' = 1.5972$
III : $n_D = 1.6240$     $n_G' = 1.6448$

I claim:

1. In a photographic objective the combination of three cemented lenses having a collective cemented surface near to and convex towards the diaphragm and a dispersive cemented surface distant from and concave towards the diaphragm, the difference between the refractive indices at the collective cemented surface amounting to at least double the difference at the dispersive cemented surface.

2. Double objective, each component of which consists of three cemented lenses with a collective cemented surface near to and convex towards the diaphragm and a dispersive cemented surface distant from and concave towards the diaphragm, in each component the difference between the refractive indices at the collective cemented surface amounting to at least double the difference at the dispersive cemented surface.

PAUL RUDOLPH.

Witnesses:
PAUL KRÜGER,
FRITZ SANDER.